UNITED STATES PATENT OFFICE.

EDWARD SONSTADT, OF LOUGHBOROUGH, GREAT BRITAIN.

IMPROVEMENT IN THE MANUFACTURE OF MAGNESIUM.

Specification forming part of Letters Patent No. 45,370, dated December 6, 1864.

*To all whom it may concern:*

Be it known that I, EDWARD SONSTADT, of Loughborough, in the county of Leicester, a subject of the Queen of Great Britain, have invented or discovered new and useful Improvements in the Manufacture of the Metal Magnesium; and I, the said EDWARD SONSTADT, do hereby declare the nature of the said invention and in what manner the same is to be performed to be particularly described and ascertained in and by the following statement thereof—that is to say:

This invention has for its object improvements in the manufacture of the metal magnesium.

The process consists in mixing a solution of chloride of magnesium with a solution of chloride of sodium, drying the mixed solutions, and heating the dried mass to redness in a platinum crucible. The fused mass may be conveniently poured off into an iron vessel in which it is allowed to cool. This mixture of anhydrous chloride of magnesium with chloride of sodium I call the "material." From this material magnesium is obtained by heating it with sodium to full redness in an iron crucible to which a closely-fitting cover is adapted. The solution of chloride of magnesium used in this process may be conveniently obtained by digesting either native carbonate or hydrate of magnesia in commercial hydrochloric acid. The acid should be completely saturated, so that iron and other impurities may be thrown down and the clear liquid siphoned or filtered off for use. The magnesia or carbonate of magnesia used should be free or nearly free from lime, and the hydrochloric acid should be selected with reference to its degree of freedom from sulphuric acid and arsenic; but the presence of small quantities of iron is of little consequence, as this is precipitated by the magnesia. The magnesia alba of commerce is not well fitted for use in this manufacture, because it contains much combined sulphuric acid. A suitable quality of magnesia may, however, be obtained as follows: I precipitate Epsom salts by soda or carbonate of soda, allow the precipitate to subside, and decant off the water. I then wash the precipitate repeatedly with hot or boiling water and dry it between each washing either by strong pressure or by a centrifugal machine. These alternate washings and dryings I repeat until the wash-waters show no precipitate with chloride of barium. In certain cases a convenient source of solution of chloride of magnesium might be found in the mother-liquors of sea-water left after the extraction of the principal part of the chlorides of sodium and of potassium. The presence of the potassium chloride would not be disadvantageous. The solution of chloride of sodium for mixture with the solution of chloride of magnesium should be freed from the combined sulphuric acid which it contains by a sufficient quantity of solution of chloride of barium, any excess of which may be removed by carbonate of soda, and excess of the latter may be neutralized by hydrochloric acid. The proportion in which the solutions of chloride of sodium and of chloride of magnesium are mixed may be considerably varied without much affecting the result. The proportion that I consider preferable is, however, that of equal atoms of the two salts. The solution of the two chlorides may be evaporated to (seeming) dryness either in porcelain dishes or, preferably, in platinum dishes. The conduct of the ignition of the dried mass in the platinum crucible needs no special remark, except that it is advisable to exclude free access of air by a cover furnished with a small hole or tube for the escape of steam and vapors. In filling the iron crucible with the material and sodium I find it best to put all the sodium at the bottom of the crucible, which is then filled up with material.

The cover to the crucible should have an inside flange, and it is better that it should be fastened down. The crucible should remain in the fire until it attains a full red heat. It is then removed and allowed to become cool before it is opened. The quantity of sodium used should be from one-sixth to one-fifth of the weight of the material used. More or less may be used, but not so advantageously. When the crucible is opened a portion of the magnesium is found in lumps toward the top of the (once) fused mass. Sometimes globules of magnesium may be interspersed throughout; but usually the flux is nearly clear of metal from the upper layer till toward the bottom of the crucible. After the lump magnesium has been removed the clear portion of the flux should be taken out. When the clear flux has been removed the bottom portion is found to be a gray or blackish mass containing magnesium interspersed mostly in a finely-divided state, but also invisible globules of various sizes. The whole of this metalliferous mass should be placed immediately in air-tight and dry vessels, where it is kept out of access of air, ready for a subsequent process. The magnesium thus obtained may be purified and fused into a mass of any desired size by throwing it into chloride of magnesium kept fused in a crucible. The crucible-cover must be instantly put on and the heat continued for a few minutes, more or less, according to the quantity operated upon. The cover is then quickly removed and the mass is compressed by a rather large and perfectly dry and clean iron rod. As the chloride of magnesium begins to solidify, the heat meanwhile being diminished, the metal may be compressed into globules, which may usually be run together. The magnesium rarely takes fire; but should this happen it is only necessary instantly to adapt the cover. When cold the lump magnesium may be washed with dilute acetic or nitric acid and then thoroughly with water. The surface of the metal is thus brightened; but if the washing-acid contain iron the latter is instantly precipitated upon the surface of the magnesium and blackens it.

I would remark that the above-described process corresponds with that for which I obtained a patent in Great Britain, dated the 8th November, 1862. I have since devised some variations or improvements in the process for which I have obtained a second patent in Great Britain, and for which, also, I propose immediately to petition for the grant of a patent in the United States of America.

Having thus described the nature of my said invention and the manner of performing the same, I would have it understood that I do not confine myself to the exact details; but

What I claim is—

The manufacture of the metal magnesium by acting by means of sodium on a material obtained by evaporating to dryness and then heating to redness a mixture in solution of chloride of magnesium with chloride of sodium, substantially as described, and combined therewith the employment of an iron crucible or vessel for conducting the aforesaid process, substantially as described.

E. SONSTADT.

Witnesses:
  WM. HAHN,
Clerk to Messrs. Charlewood & Ormerod, Solrs., Manchester.
  WM. HUGHES,
Yarn Agent, 9 New Market Lane, Manchester.